United States Patent Office 3,517,463
Patented June 30, 1970

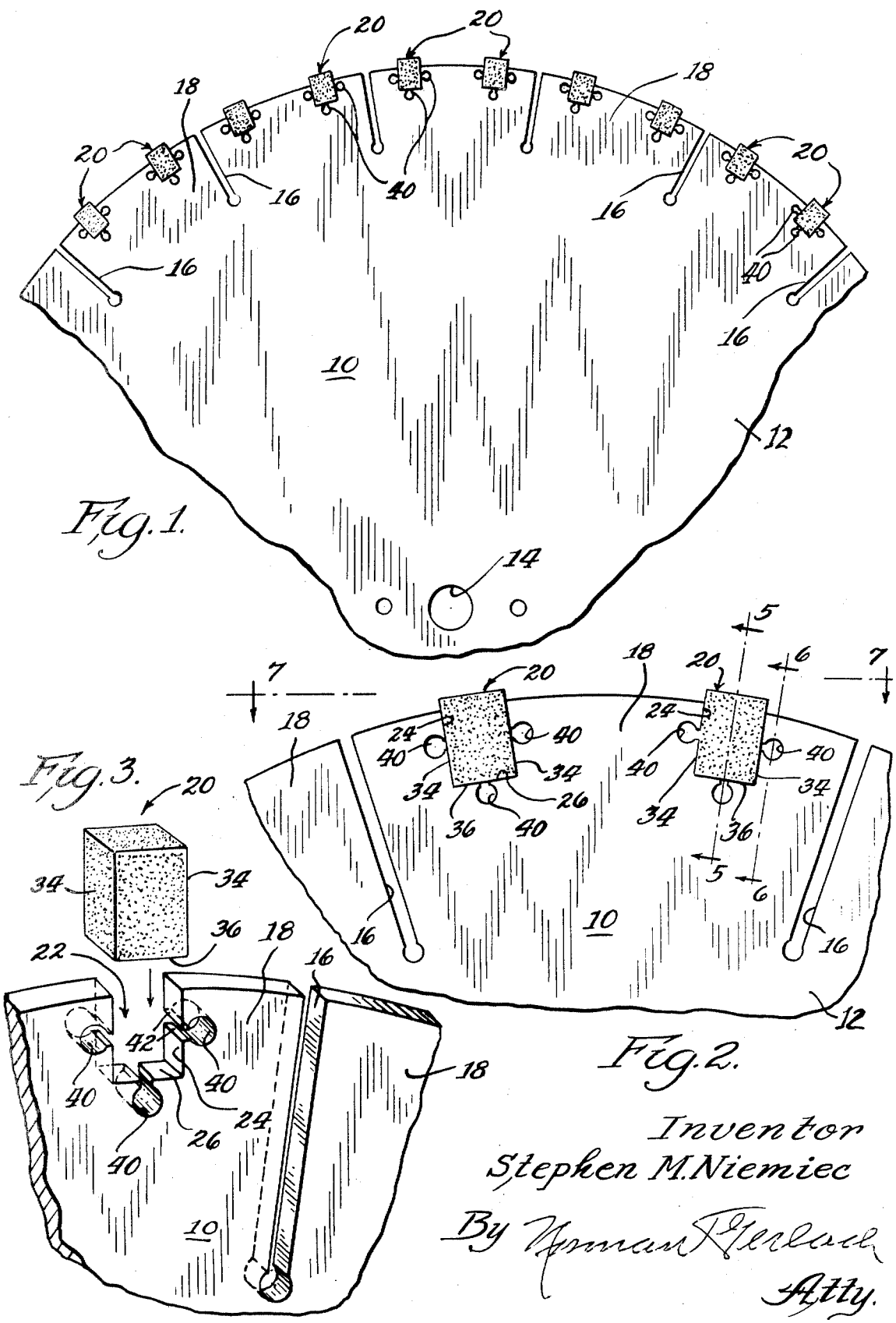

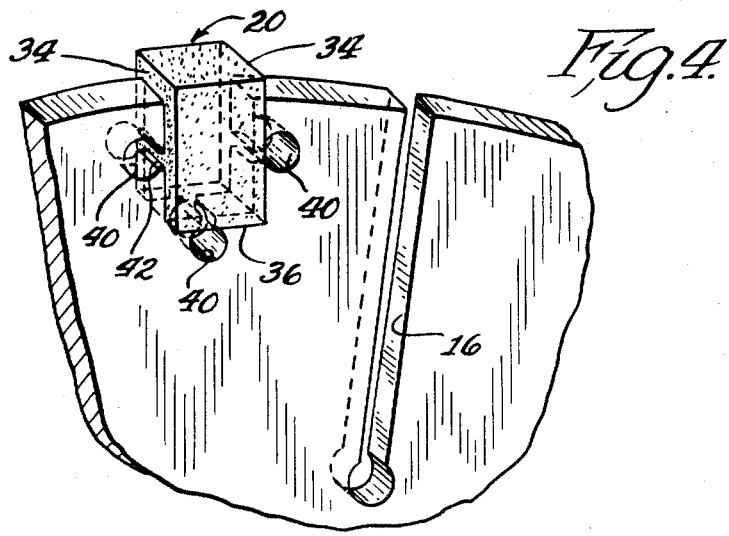
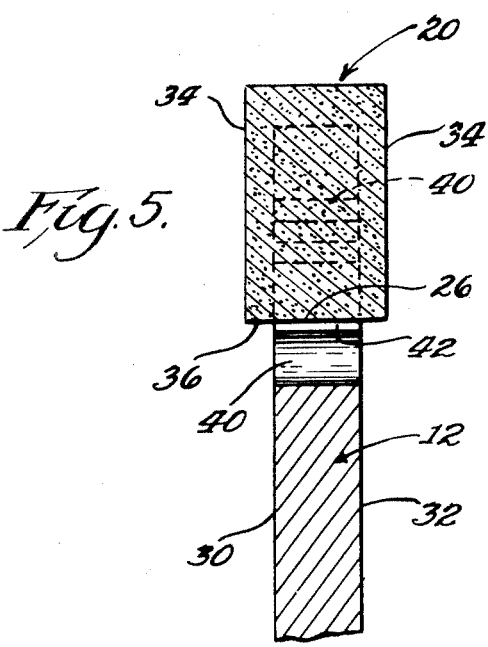 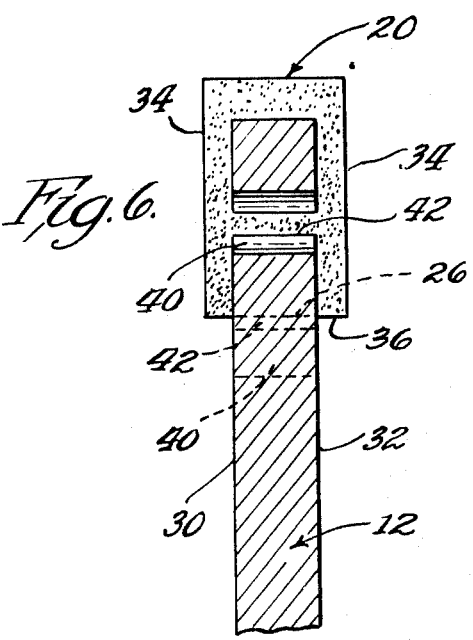
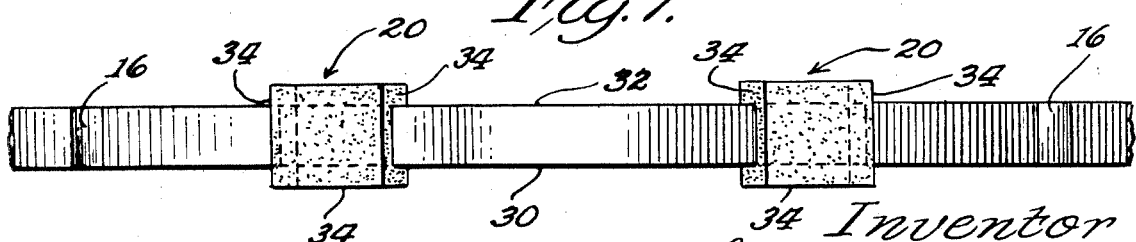
Inventor
Stephen M. Niemiec

3,517,463
ROTARY SEGMENTAL SAW WITH DRY-
CUTTING CHARACTERISTICS
Stephen M. Niemiec, Chicago, Ill., assignor to Super-Cut,
Inc., Chicago, Ill., a corporation of Illinois
Filed Mar. 6, 1968, Ser. No. 710,924
Int. Cl. B24d 5/10; B28d 1/04
U.S. Cl. 51—206.4                                7 Claims

ABSTRACT OF THE DISCLOSURE

A rotary segmental saw having peripheral segments which are air cooled by means of proximate air passages which extend transversely through the circular blade of the saw.

---

The improved rotary segmental saw comprising the present invention is designed for use primarily in connection with the sawing or cutting of asbestos board and any and all similar materials which are not conducive to the use of a liquid coolant during the sawing operation. The invention is, however, capable of other uses and a rotary segmental saw embodying the principles of the invention may, if desired, be employed in association with a suitable liquid coolant for sawing limestone, marble, granite and the like. Irrespective of the particular use to which the invention may be put, the essential features thereof remain substantially the same.

The present rotary segmental saw is, therefore, useable interchangeably and without modification either as a dry-cutting saw or as a wet-cutting saw, but inasmuch as it has been developed to overcome the numerous limitations that are attendant upon the use of a conventional rotary segmental saw when the latter is put to use without embodying a liquid cooling medium, the dry-cutting characteristics of the present saw will be stressed throughout this specification and in the appended claims.

The rotary segmental saw of the present invention does not differ in its fundamental structural characteristics from a conventional stone cutting saw of the type which embodies for cutting purposes an annular series of peripheral, circumferentially spaced, block-like segments in the form of metallic matrices with crushed or fragmented diamond or other abrasive particles distributed throughout the same. Such a conventional stone cutting saw further involves in its general organization a flat-sided, circular, metallic saw body or blade having a central arbor hole therein, and to the periphery of which the block-like cutting segments are applied by a soldering, brazing or other similar operation involving the application of heat.

Heretofore, a conventional rotary segmental saw of the general type briefly outlined above has proven altogether unsatisfactory for dry-cutting operations, especially when the work involved is asbestos board or similar material which deteriorates or decomposes when wet. It has been found that with a conventional rotary segmental saw the individual block-like cutting segments, when not cooled with a liquid coolant, becomes extremely hot and generates sufficient heat to melt the solder or brazing material in the vicinity of the segments, thus causing the block-like cutting segments to become detached from the periphery of the associated saw blade. Not only does loosening and detachment of the segments with respect to the saw blade destroy the effectiveness of the saw as a whole, but they also create a hazard to the operating personnel, considering the high speed of rotation at which the saw is usually operated. For these reasons, the cutting of asbestos board and any similar material has been accomplished by abrasion, utilizing costly abrasive wheels made of silicon carbide and the like and with the net result that an inordinately long cutting time is involved. Alternatively, limited amounts of liquid coolant have been employed in moderation, thus necessitating prolonged and costly drying operations after the asbestos board or other work material has been cut.

The present invention is designed to overcome the aforementioned limitations that are attendant upon the cutting of asbestos board and any and all similar materials, and toward this end, the invention contemplates the provision of a novel rotary segmental saw which embodies novel means whereby the individual block-like cutting segments on the peripheral of the metallic saw blade are air-cooled under the influence of convection currents of air which are caused to circulate transversely through passages, the latter being formed or provided in the peripheral portion of the metallic saw blade in the immediate vicinity of the cutting segments, and specificially at the regions where the segments are heat-bonded to the blade. According to the invention, such convection currents of air are initiated by air turbulence in, at or near the actual cutting region of the saw, as well as by similar convection currents which are generated by the sweeping action of the various block-like cutting segments as they travel in their circular path of movement after leaving the cutting region and until they again enter such region. Although the exact cause of the generation of these convection currents of air in and around the cutting segments of a saw embodying the present invention has not been completely and definitely ascertained, it has been found in actual practice that the saw will, in fact, operate successfully and for prolonged periods of time upon asbestos board and similar material without retention of appreciable generated heat and consequent loss of segments. When the nature of the invention has been better understood, certain theoretical considerations in support of the generation of these convection currents of air transversely through the saw blade in the vicinity of the block-like cutting segments will be advanced.

According to the present invention, provision for such transverse currents of cooling air is made by providing radially extending notches in the peripheral portion of the saw blade, there being one notch for each segment, and by inserting the segments in their respective notches and bonding them in position therein. Prior to insertion of the segments in their respective notches, small holes are drilled through the saw blade close to the sides of each notch in a nearly tangential relationship with respect to such sides and, thereafter, the crown or bridge of metal which separates each hole from its associated notch is broken away so as to leave a cylindrical void which is in the form of a major circle sector through the blade and is in communication with the associated notch. When each block-like cutting segment is subsequently inserted in its respective notch and then bonded in place, each substantially cylindrical hole is, in effect, restored, and assumes a truly tangential relationship with respect to the segment so that the sides of the segment are exposed for convection cooling, all in a manner that will be made clear presently.

The provision of a rotary segmental saw of the character briefly outlined above being the principal object of the invention, various other objects and advantages, not at this time enumerated, will readily suggest themselves from a consideration of the following description.

The invention consists in the several novel features which are hereinafter set forth and are more particularly defined by claims at the conclusion hereof.

In the accompanying two sheets of drawings forming a part of this specification, one illustrative embodiment of the invention is shown.

In these drawings:

FIG. 1 is a fragmentary quarter-section side elevation of a rotary segmental saw embodying the principles of the present invention;

FIG. 2 is an enlarged view of a portion of the saw of FIG. 1;

FIG. 3 is a fragmentary exploded perspective view of a limited portion of the peripheral region of the saw and illustrating the manner of installation of one of the block-like cutting segments within the notch in the peripheral portion of the blade of the saw;

FIG. 4 is a perspective view similar to FIG. 3, but showing the one segment after installation thereof in its notch;

FIG. 5 is a radial and transverse sectional view taken on the line 5—5 of FIG. 2;

FIG. 6 is a similar sectional view taken on the line 6—6 of FIG. 2; and

FIG. 7 is an edge view of the structure of FIG. 2.

Referring now to the drawings in detail, a rotary segmental saw embodying the present invention is designated in its entirety by the reference numeral 10 and it is comprised of a blade 12 in the form of a flat, circular, disk-like body of metal, preferably steel, such blade having the usual central opening 14 therein in order that the saw may be suitably mounted on a rotary shaft or arbor (not shown). Segmental saws of the type under consideration are usually made in various sizes ranging in diameter from a matter of inches to ten or more feet, with the thickness of the blade increasing commensurately with the blade diameter.

As is customary with saws of this general type, the circular blade 10 is formed with a large multiplicity of equally spaced radial slots 16 which are relatively narrow and which extend inwardly from the periphery of the blade. These slots 16 define a series of intervening rim portions 18 which, by reason of the slots, are effectively heat insulated from one another so that during the application of heat to the rim portions 18 for the purpose of soldering or brazing cutting segments to the same, the heat which is applied to any one rim portion will be isolated in that one rim portion and not cause circumferential expansion and consequent buckling of the rim of the blade 10.

As best illustrated in FIG. 2 of the drawings, each rim portion 18 carries one or more cutting segments 20, two such segments being shown in the illustrated form of the invention. Each segment is preferably brazed in position within a notch 22 provided for it in the associated rim portion 18 (see also FIG. 3). Each notch 22 is of rectangular configuration so as to provide a pair of substantially radially extending sidewalls 24 and a bottom wall 26 which extends substantially in a circumferential direction. The segments 20 also are of rectangular or block-like configuration, each segment being in the form of a hexahedron which, when fitting within its associated notch 22, is of greater radial height or extent than the depth of the notch so that its outer portion overhangs the periphery of the blade 12. Each segment also is slightly wider than the thickness of the blade so that it also overhangs the two opposite side faces 30 and 32 of the blade (see particularly FIGS. 5, 6 and 7). When in position within its respective notch 22, each segment 20 completely fills the notch.

All of the notches 22 are identical in size and shape, as also are the block-like cutting segments 20. As shown in FIGS. 3 and 4, each segment is provided with side faces 34 which fit against the sidewalls 24 of the associated notch 22, and with a bottom face 36 which fits against the bottom wall 26. The various segments are preferably in the form of metallic matrices throughout which there are substantially uniformly distributed quantities of crushed or fragmented diamonds or other abrasive particles, although other types of cutting segments are contemplated.

As clearly shown in FIGS. 2 and 4, three approximately cylindrical passages 40 extend transversely through the saw blade 12 in the vicinity of each cutting segment 20. Two of these passages are substantially tangential to the side faces 34 of the associated segment 20, while the other passage is substantially tangential to the bottom face 36 of the segment. As will be described in greater detail presently, each of the passages 40 provides a transverse passage for the circulation of air during a given cutting operation, the thus circulated air serving to conduct the heat of friction from the associated segment 20. The provision of these passages 40 constitutes the principal feature of the present invention and it is the feature which makes possible the use of the saw 10 in dry-cutting operations as, for example, the cutting of asbestos board which is a mixture of asbestos and cement.

A convenient method of establishing the various passages 40 and of installing the segments 20 to produce the completed saw 10 is schematically illustrated in FIGS. 3 and 4 of the drawings. Assuming the various radial slots 16 and the notches 22 to have been pre-formed in the circular steel blade 12, and considering only one notch 22 and its associated segment 20, the three passages 40 are formed by drilling or boring transversely through the blade at the approximate locations wherein they are illustrated in FIG. 3 but with the passages being entirely contained by the metal of the blade so that the drill which is used will have centripetal support throughout 360° and will not shift sidewise and into the area of the notch 22. The drilled passages will, therefore, lie close to the walls 24 and the bottom wall 26 of the notch 22 but will not intersect the same. After these passages are formed, the narrow steel bridge or web which separates each passage from the adjacent wall of the notch 22 is removed, preferably by sawing through the same, thus establishing a void which is in the form of a major circle sector which terminates in a pair of opposed exit lips 42 (see FIG. 5) and which enters upon or communicates with the notch 22 through a narrow slot 23. Installation of the segment 20 in the notch is made by a conventional brazing method involving the application of heat to the segment and blade in the vicinity of the notch 22, the segment fitting snugly within the notch and completely filling the same as shown in FIG. 4. Installation of the segment 20 recloses the open side of the void and thus establishes the aforementioned passageway 40 through which air is adapted to pass for segment-cooling purposes when the saw is put to normal use.

In the operation of the herein described rotary segmental saw 10, the cooling effect to which the block-like cutting segments 20 and the metal of the blade 12 in the immediate vicinity of the segments are subjected is attributable to the fact that during high-speed rotation of the saw convection currents of air are caused to flow through the transverse passages 40 with small increments of air displacement in either direction taking place indiscriminately. Ostensibly, from purely theoretical considerations, since the pressure of air on opposite sides of the saw blade is always the same, there is no constant motivating force which ordinarily would cause a one-way flow of air through the passages 40. Neither is there at the opposite ends of the passages any prolonged pressure differential which would sustain a complete flow of air from one end of a given passage to the other. Nevertheless, the cooling effect which has been found in actual practice to be present is deemed to be attributed to the fact that during high-speed rotation, particularly when the saw is operating upon a material such as asbestos board or fiberboard, considerable air turbulence is set up in the vicinity of the passages 40, thus resulting in irregular oscillation or back and forth movement of air within the passages with some air being expelled from the passages and other air entering the same. This action may be compared to a washing action such as would take place when a perforated disk partially submerged in a pool of clear liquid is rotated in its own plane. It cannot be denied that if the various perforations were filled with a tenacious film of colored material such as ink, these perforations would come out clean and clear as they emerged from the liquid pool. This washing action in the case of the present rotary segmental saw may, to a certain extent, be enhanced by audible or non-audible harmonic vibrations which are set up as in the case of a simple whistle. Although the exact phenomena by means of which air circulation through the various passages 40 may be initiated may not be precisely defined at the present time, it is deemed sufficient to state that a saw embodying the present invention as described herein has been found to be capable of cutting asbestos board and similar materials in a dry state without the use of a liquid coolant, the saw operating efficiently for prolonged periods of time, whereas an identical saw having no passages 40 has been found to accumulate sufficient peripheral heat as to melt the brazing or soldering material by means of which the segments 20 are held in position within the notches 22.

The invention is not to be limited to the exact arrangement of parts shown in the accompanying drawings or described in this specification as various changes in the details of construction of the saw may be resorted to without departing from the spirit or scope of the invention. Similarly, the specific method set forth herein for installation of the segments 20 on the periphery of the circular blade 12 may be varied within certain limits as required. Therefore, only insofar as the invention is particularly pointed out in the accompanying claims is the same to be limited.

Having thus described the invention what I claim as new and desire to secure by Letters Patent is:

1. A rotary segmental saw designed primarily for use in sawing asbestos board and similar material in the absence of a liquid coolant, said saw comprising a substantial flat disk-like blade the rim of which is interrupted by a series of inwardly extending notches, and a cutting segment fitting in each notch and substantially filling the same, each cutting segment having portions thereof overhanging the opposite sides of the blade, there being at least one transverse air passage extending through the blade and communicating with each notch in the immediate vicinity of the cutting segment therein.

2. A rotary segmental saw as set forth in claim 1 and wherein each air passage is in the form of a relatively small cylindrical bore which is in the form of a major circle sector and communicates with the adjacent notch through a narrow slot thus exposing a limited portion of the associated cutting segment to the interior of the bore.

3. A rotary segmental saw as set forth in claim 1 and wherein each notch is generally of rectangular configuration so as to present a pair of substantially radially extending opposed side walls and a substantially circumferentially extending bottom wall, each cutting segment is in the form of a parallelepiped, there are a plurality of air passages for each notch, and each air passage is disposed in close proximity to one of said walls.

4. A rotary segmental saw as set forth in claim 3 and wherein there are three air passages for each notch, said three air passages are disposed, respectively, adjacent to the three walls of the associated notch, and each air passage is substantially tangential to its adjacent wall at the mid-point of the latter.

5. A rotary segmental saw as set forth in claim 4 and wherein each air passage has its axis perpendicular to the general plane of the blade.

6. A rotary segmental saw as set forth in claim 3 and wherein the circular rim of the blade is further interrupted by a series of radially extending narrow slots which divide the circumferential region of the blade into a series of circumferentially spaced rim portions, the radial extent of each slot being greater than that of the inwardly extending notches, each rim portion embodying at least one of said notches and its associated cutting segment.

7. In the construction of a rotary segmental saw of the type that is primarily designed for use in sawing asbestos board and similar material in the absence of a liquid coolant, the method of mounting a cutting segment on the periphery of the disk-like blade of the saw so that it overhangs the opposite sides thereof as well as the blade periphery, said cutting segment being in the form of a parallelepiped of rectangular configuration in three directions, said method comprising:

(a) forming a rectangular notch in the periphery of the blade of a size commensurate with that of the cutting segment and thus providing a pair of substantially parallel radially extending side walls and a substantially circumferentially extending bottom wall;

(b) forming a small diameter cylindrical passage transversely through the blade in the vicinity of each of said walls near the central region thereof and at a center distance from the wall which is slightly greater than the radius of the passage thus causing the passage to be spaced from the notch by a thin web portion;

(c) removing said web portion so as to establish communication between the passage and the notch;

(d) inserting said cutting segment into the notch so as substantially to fill the latter and expose limited portions of the segment to the interior of each of the passages; and (e) bonding the cutting segment in position within the notch.

References Cited

UNITED STATES PATENTS

| 3,110,579 | 11/1963 | Benson et al. | 125—15 X |
| 3,146,561 | 9/1964 | Lindblad | 125—15 X |
| 3,196,584 | 7/1965 | Tatko | 51—206 |
| 3,363,617 | 1/1968 | Hoerer | 125—15 |

OTHELL M. SIMPSON, Primary Examiner

U.S. Cl. X.R.

125—15